United States Patent
Oleson et al.

(10) Patent No.: US 11,275,970 B2
(45) Date of Patent: Mar. 15, 2022

(54) SYSTEMS AND METHODS FOR DISTRIBUTED DATA ANALYTICS

(71) Applicant: Xailient, Sydney (AU)

(72) Inventors: Lars Oleson, Bondi (AU); Shivanthan Yohanandan, Pakenham (AU); Ryan Mccrea, Etobicoke (CA); Deepa Lakshmi Chandrasekharan, Strathfiled (IN); Sabina Pokhrel, Kathmandu (NP); Yousef Rabi, Peakhurst (AU); Zhenhua Zhang, Chatswood (AU); Priyadharshini Devanand, Lidcombe (IN); Bernardo Rodeiro Croll, Kingsford (AU); James J. Meyer, Van Meter, IA (US)

(73) Assignee: Xailient, Sydney (AU)

( * ) Notice: Subject to any disclaimer, the term of this patent is extended or adjusted under 35 U.S.C. 154(b) by 0 days.

(21) Appl. No.: 17/314,465

(22) Filed: May 7, 2021

(65) Prior Publication Data
US 2021/0350180 A1    Nov. 11, 2021

Related U.S. Application Data

(60) Provisional application No. 63/021,735, filed on May 8, 2020.

(51) Int. Cl.
*G06K 9/62* (2006.01)
*G06N 3/08* (2006.01)
(Continued)

(52) U.S. Cl.
CPC ....... *G06K 9/6257* (2013.01); *G06K 9/00221* (2013.01); *G06K 9/4652* (2013.01);
(Continued)

(58) Field of Classification Search
CPC .. G06K 9/6257; G06K 9/6262; G06K 9/4652; G06K 9/4671; G06K 9/6253; G06K 9/6255; G06K 9/00221; G06N 3/08
See application file for complete search history.

(56) References Cited

U.S. PATENT DOCUMENTS 10,007,867 B2 *  6/2018  Yu .................... G06K 9/6215
10,979,625 B2 *  4/2021  Lee .................. H04N 5/232935
(Continued)

FOREIGN PATENT DOCUMENTS

| CN | 110245659 A | 9/2019 |
|---|---|---|
| WO | WO-2018/232378 A1 | 12/2018 |
| WO | WO-2019/176235 A1 | 9/2019 |

OTHER PUBLICATIONS

Jiao et al. 'A Survey of Deep Learning-based Object Detection', IEEE Access, vol. 7, Sep. 5, 2019, pp. 128837-128868.
(Continued)

*Primary Examiner* — Wesley J Tucker
(74) *Attorney, Agent, or Firm* — Goodwin Procter LLP

(57) ABSTRACT

The invention provides systems and method for generating device-specific artificial neural network (ANN) models for distribution across user devices. Sample datasets are collected from devices in a particular environment or use case and include predictions by device-specific ANN models executing the user devices. The received datasets are used with existing datasets and stored ANN models to generate updated device-specific ANN models from each of the stored instances of the device ANN models based on the training data.

29 Claims, 4 Drawing Sheets

(51) Int. Cl.
*G06K 9/00* (2006.01)
*G06K 9/46* (2006.01)

(52) U.S. Cl.
CPC ......... *G06K 9/4671* (2013.01); *G06K 9/6253* (2013.01); *G06K 9/6255* (2013.01); *G06K 9/6262* (2013.01); *G06N 3/08* (2013.01)

(56) References Cited

U.S. PATENT DOCUMENTS

| | | | |
|---|---|---|---|
| 2013/0176430 A1* | 7/2013 | Zhu | G06T 7/254 348/143 |
| 2015/0089399 A1* | 3/2015 | Megill | G06Q 30/0203 715/753 |
| 2018/0285682 A1* | 10/2018 | Najibi | G06K 9/6289 |
| 2019/0132520 A1* | 5/2019 | Gupta | H04N 5/232127 |
| 2019/0279044 A1* | 9/2019 | Vasisht | G06N 3/0454 |
| 2019/0303725 A1* | 10/2019 | Gurvich | G06K 9/00664 |
| 2020/0335208 A1* | 10/2020 | Talmor | G06N 20/00 |
| 2021/0035287 A1* | 2/2021 | Kim | G06N 3/0454 |
| 2021/0056315 A1* | 2/2021 | Kale | B60R 25/102 |
| 2021/0150721 A1* | 5/2021 | Yohanandan | G06K 9/00791 |
| 2021/0176239 A1* | 6/2021 | Rose | H04L 63/0428 |

OTHER PUBLICATIONS

International Search Report and Written Opinion for Application No. PCT/IB2021/053953 dated Aug. 2, 2021.

\* cited by examiner

SYSTEMS AND METHODS FOR DISTRIBUTED DATA ANALYTICS

CROSS-REFERENCE TO RELATED APPLICATION(S)

This application claims priority to, and the benefit of U.S. provisional patent application Ser. No. 63/021,735, entitled "Systems and Methods for Distributed Data Analytics" filed on May 8, 2020, the entire disclosure of which is incorporated by reference herein.

TECHNICAL FIELD

The following disclosure is directed to methods and systems in data analytics, and more specifically a data analytics framework and distribution of data tools related to the same.

BACKGROUND

With the rise of intelligent systems, the amount of data being retrieved, transmitted, and further processed is continuously growing.

Complex data analytics may implement machine learning mechanisms and use large training datasets to train neural networks. These neural networks may then be used to process input data within a similar domain as the large training dataset. Applying such complex neural network logic to wider varieties and larger datasets of input data can prove difficult and computationally intensive. As such, methods and systems for providing access to data processing tools and a distributable data analytics platform as disclosed herein provides such systems with the benefits of greater platform adoption and distribution, larger data acquisition, enhanced training efficacy, and improved execution efficiency.

As such, improved methods and systems for data processing using neural networks would benefit greatly from improved execution efficiency.

SUMMARY OF THE INVENTION

Current data analytics platforms use a variety of external tools to accomplish particular tasks. The present disclosure describes techniques and related systems that facilitate complex data analytics using tools that may be accessed remotely at a uniform platform or otherwise distributed across numerous devices using a defined analytics framework.

Disclosed herein are exemplary embodiments of methods and supporting systems that facilitate data analytics using wide swaths of data stores, neural networks, and other data science tools. Providing access to such powerful tools supports a wider adoption base and, therefore, results in larger and more accurate datasets for training and development purposes. The ease of user interactions depends primarily on the user interface provided by the platform, as well as the methods used to provide access to the powerful data analytics tools, model training mechanisms and neural networks implemented therein. The various systems and methods provided by the invention actively employ numerous neural networks working in tandem to process input data and identify a zone of interest, and/or objects of interest within the zones, while providing users with a clean and easily readable interface to review input and training data, enhance the accuracy of the models used by the networks, and visualize the results.

The object can be inanimate object and identified generally (e.g., "a car" or "a pedestrian") or a specific object and identified specifically, based for example, on facial recognition, character recognition or a combination of similar techniques.

Therefore, in a first aspect, the invention provides a method for generating device-specific artificial neural network (ANN) models for distribution across user devices, such as smart phones, cameras, and other internet-of-things (IoT) devices. In various embodiments, the method includes receiving, by a processor, sample datasets from the user devices of a user environment, wherein the sample datasets comprise media data and predictions by device-specific ANN models executing on the user devices and writing, by the processer, the sample datasets to a training data store. The method also includes identifying, by the processor and in a data store, (i) a use case dataset, the use case dataset comprising at least training data parameters, (ii) training data from the sample datasets that meet the training data parameters provided in the use case dataset and (iii) stored instances of the device-specific ANN models. The processor then generates updated device-specific ANN models from each of the stored instances of the device ANN models based at least in part on the identified training data. In some cases a library of device-specific parameters and training data is maintained, and the generation of the updated device-specific ANN models is further based on the device-specific parameters and training data.

In some embodiments, the media data comprises image data and application of the ANN models to the image data facilitates the identification of objects of interest within the image data. The training data parameters may include media data parameters such as a color index, a brightness index, a contrast index, an image temperature, a tint, one or more hue values, and/or a gamma value and/or device parameters such as available memory, processing speed, image resolution, and/or frame-rate capture.

In some cases, the use case dataset is specific to a particular use case, and may, in some instances, include an environmental aspect (such as placement of the device in an outdoor environment, placement of the device in an indoor environment, placement of the device in a well-lit environment, or placement of the device in a poorly-lit environment), and a functional aspect (e.g., facial recognition, character recognition, document certification, etc.). In some embodiments, the predictions generated by the device-specific ANN models include a quantitative image salience metric for each image that indicates the likelihood that the media file contains an object of interest, and, in some cases, based at least in part on the quantitative image salience metrics for each image, determining a minimum number of images necessary to achieve a threshold model accuracy.

In some cases, the method further includes distributing the device-specific updated ANN models to at least a subset of the user devices associated therewith.

In another aspect, the invention provides a system for generating device-specific artificial neural network (ANN) models for distribution across user devices, such as smart phones, cameras, and other internet-of-things (IoT) devices. The system includes one or more processors and a memory coupled with the processors, wherein the processors execute a plurality of modules stored in the memory. The modules include a user interface that receives instructions from a user, the instructions identifying one or more sample datasets from the user devices of a user environment, and wherein the sample datasets comprise media data and predictions by device-specific ANN models executing on the user devices, a data store comprising the sample datasets, a business logic module that, when executed, (i) identifies a use case dataset stored in the data store, the use case dataset comprising at least training data parameters (ii) identifies training data from the sample datasets that meet the training data parameters provided in the use case dataset and (iii) identifies device-specific ANN models stored in the data store, and an artificial intelligence machine learning module that when executed generates updated device-specific ANN models from each of the stored instances of the device ANN models based on the training data.

In some embodiments, the media data comprises image data and application of the ANN models to the image data facilitates the identification of objects of interest within the image data. The training data parameters may include media data parameters such as a color index, a brightness index, a contrast index, an image temperature, a tint, one or more hue values, and/or a gamma value and/or device parameters such as available memory, processing speed, image resolution, and/or frame-rate capture.

In some cases, the use case dataset is specific to a particular use case, and may, in some instances, include an environmental aspect (such as placement of the device in an outdoor environment, placement of the device in an indoor environment, placement of the device in a well-lit environment, or placement of the device in a poorly-lit environment), and a functional aspect (e.g., facial recognition, character recognition, document certification, etc.). In some embodiments, the predictions generated by the device-specific ANN models include a quantitative image salience metric for each image that indicates the likelihood that the media file contains an object of interest, and, in some cases, based at least in part on the quantitative image salience metrics for each image, determining a minimum number of images necessary to achieve a threshold model accuracy.

In some cases, a distribution module distributes the device-specific updated ANN models to at least a subset of the user devices associated therewith.

In another aspect, the invention provides a method for optimizing the execution of device-specific trained artificial neural network (ANN) models on edge devices (such as smart phones, cameras, and other internet-of-things (IoT) devices), which includes receiving, by a processor, a first trained ANN model and a second ANN model, wherein the first ANN model and the second ANN model each execute different inferences on input data and wherein the output of the first ANN model serves as input to the second ANN model, and merging the first ANN model, the second ANN model, and control flow execution instructions into a combined software package for deployment to an edge device for execution thereon according to the control flow instructions.

In certain embodiments, the first trained ANN model and second trained ANN model each comprise respective analytics criteria and use case data and the processor selects the first and second ANN models based, at least in part, on the analytics criteria therein. A parent ANN may be generated as a meta-architecture based on the first ANN model architecture and the second ANN model architecture, and the meta-architecture can then be delivered to the edge device such that it executes as a single ANN model. In embodiments in which the edge device is a camera, execution of the first ANN model and second ANN model on the camera can identify an object of interest in an image file captured on the camera.

In another aspect, the invention provides a system for optimizing the execution of device-specific trained artificial neural network (ANN) models on edge devices (such as smart phones, cameras, and other internet-of-things (IoT) devices). The system includes one or more processors and a memory coupled with the one or more processors wherein the one or more processors executes computer-executable instructions stored in the memory. When executed, the instructions identify, in a data store, a first trained ANN model and a second ANN model, wherein the first ANN model and the second ANN model each execute different inferences on input data and wherein the output of the first ANN model serves as input to the second ANN model, merge the first ANN model, the second ANN model, and control flow execution instructions into a combined software package, and deploy, using a distribution module, the combined software package to an edge device for execution thereon according to the control flow instructions.

In certain embodiments, the first trained ANN model and second trained ANN model each comprise respective analytics criteria and use case data and the processor selects the first and second ANN models based, at least in part, on the analytics criteria therein. A parent ANN may be generated as a meta-architecture based on the first ANN model architecture and the second ANN model architecture, and the meta-architecture can then be delivered to the edge device such that it executes as a single ANN model. In embodiments in which the edge device is a camera, execution of the first ANN model and second ANN model on the camera can identify an object of interest in an image file captured on the camera.

In another aspect, the invention provides a method for identifying an object of interest in an image file. The method includes receiving one or more image files, each image file potentially including an object of interest and applying a non-binary ground truth label to each image file, the non-binary ground truth label comprising a distribution of pixel-specific salience values indicating the likelihood that a particular pixel is part of the object of interest. Based on the ground truth label, a three-dimensional salience surface map having an x axis, y axis and z axis is generated, wherein x axis and y axis values define a location of the pixels in the image, and a z axis value being the pixel specific salience value. A curve shape is selected from a library of curve shapes and applying the curve shape to the salience surface map to determine a fit between the curve shape and the three-dimensional surface, and based on the fit, determining whether the image file includes the object of interest.

In some embodiments, the curve shape is selected based on the object of interest and may be based at least in part on one or more statistical distributions such as a Gaussian distribution, Poisson distribution, or a hybrid distribution. In some cases, the image file is added to a library of image files for use in training an artificial neural network (ANN) and the ANN may be trained to identify the object of interest in subsequent media files and/or to segment objects within in subsequent media files.

In another aspect, the invention provides a system for identifying an object of interest in an image file includes one or more processors and a memory coupled with the one or more processors wherein the one or more processors executes computer-executable instructions stored in the memory. When executed, the system receives one or more image files, each image file potentially including an object of interest and applying a non-binary ground truth label to each image file, the non-binary ground truth label comprising a distribution of pixel-specific salience values indicating the likelihood that a particular pixel is part of the object of interest. Based on the ground truth label, a three-dimensional surface having an x axis, y axis and z axis is generated, wherein x axis and y axis values define a location of the pixels in the image, and a z axis value being the pixel specific salience value. A curve shape is selected from a library of curve shapes and applying the curve shape to the ground truth label to determine a fit between the curve shape and the three-dimensional surface, and based on the fit, determining whether the image file includes the object of interest.

In some embodiments, the curve shape is selected based on the object of interest and may be based at least in part on one or more statistical distributions such as a Gaussian distribution, Poisson distribution, or a hybrid distribution. In some cases, the image file is added to a library of image files for use in training an artificial neural network (ANN) and the ANN may be trained to identify the object of interest in subsequent media files and/or to segment objects within in subsequent media files.

In yet another aspect, the invention provides a method for storing image data for transmission of video data that includes receiving video data in a standard video data format (such as H.264) at an edge device and extracting image slices from the video data, the image slices comprising an image, a start index time and finish index time indicating the temporal placement of the image slice in the video data, and region of interest parameters describing two dimensional coordinates of a region of interest within the image.

In certain embodiments, receipt of the video data and extraction of the image slices is executed on an edge device. The images slices may then be analyzed using one or more artificial neural networks on the edge device to determine the region of interest and if the region of interest includes an object of interest. In some cases, the image slices are identified as high resolution if the image slice includes an object of interest, and otherwise identified as low resolution. The method may further include transmitting the high resolution image slices to an artificial intelligence machine learning module for inclusion in an artificial neural network training dataset specific to the edge device on which the image was captured.

In another aspect, the invention provides a system for storing image data for transmission of video data that includes one or more processors and a memory coupled with the one or more processors wherein the one or more processors executes computer-executable instructions stored in the memory. When the instructions are executed, the system receives video data in one of a plurality of standard video data formats (e.g., H.264) at an edge device and extracts image slices from the video data, the image slices comprising an image, a start index time and finish index time indicating the temporal placement of the image slice in the video data, and region of interest parameters describing two dimensional coordinates of a region of interest within the image.

In certain embodiments, receipt of the video data and extraction of the image slices is executed on an edge device. The images slices may then be analyzed using one or more artificial neural networks on the edge device to determine the region of interest and if the region of interest includes an object of interest. In some cases, the image slices are identified as high resolution if the image slice includes an object of interest, and otherwise identified as low resolution. The method may further include transmitting the high resolution image slices to an artificial intelligence machine learning module for inclusion in an artificial neural network training dataset specific to the edge device on which the image was captured.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the implementations. In the following description, various implementations are described with reference to the following drawings.

DETAILED DESCRIPTION

Figure 1:
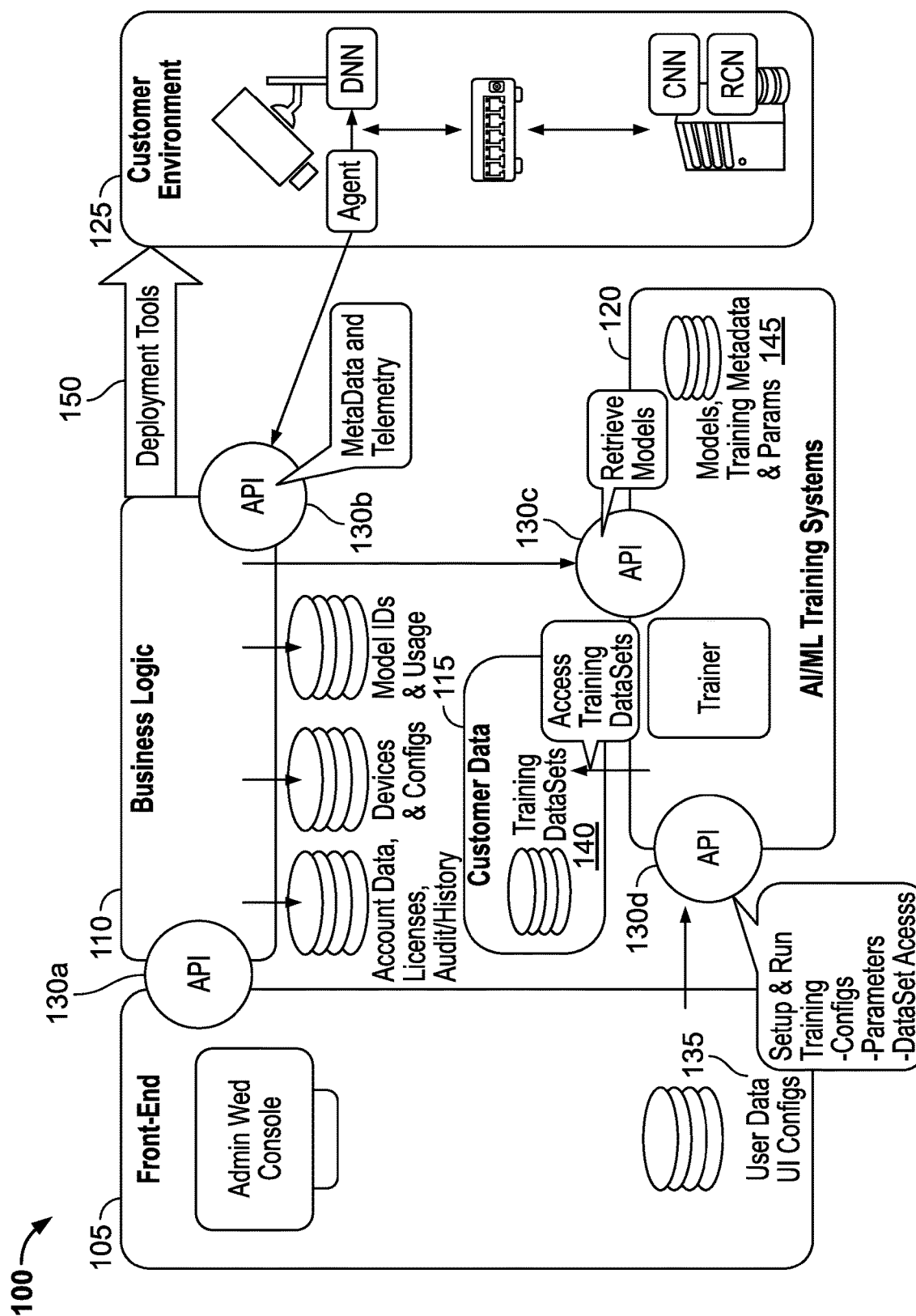
FIG. 1 is an illustration of the general arrangement of components operating in the environment in which various embodiments of the invention may be implemented.

Described herein are methods and supporting systems for generating, deploying, and further maintaining end-point deployable artificial intelligent systems, machine learning mechanisms and data models, implemented in one embodiment as a comprehensive platform. As shown in FIG. 1, the platform 100 implements a framework containing a front-end user interface ("user interface") 105 for interaction with users, a business logic module 110, a data store 115, an artificial intelligence/machine learning ("AI/ML") training module 120, and deployment tools integrated into a user environment 125. The framework components may be communicatively coupled by way of one or more APIs (130a, 130b, 130c and 130d,) as provided by the platform 100.

According to some embodiments, the platform 100 provides users of the platform one or more user interfaces 105 to access and otherwise perform data analytics on datasets 140 as provided by users and collected from endpoint devices. These user interfaces 105 may be provided in combination or separately using collections of distributed and localized applications (e.g., SDKs, APKs, IPAs, JVM files, other localized executables, and the like), APIs (e.g., JSON, REST, other data transfer protocols, and the like), websites or web application functions, among others. The user interface 105 facilitates the provision of analytics criteria to a criteria gathering system. Analytics criteria may include configurations, parameters, and access to the user's datasets. According to some embodiments, configurations and parameters may be used as or otherwise referred to as use case data. Use cases may include functional processes, such as image detection processes for facial recognition, license plate and other character recognition, identification card authentication, object detection for automated driving applications, motion detection and intruder alerts, and others. Use cases may also include environmental aspects, such as outdoor versus indoor placement, nighttime versus daytime, crowded spaces (e.g., airports, transit stations) versus sparsely populated spaces (bank security camera installations, home camera installations, etc.).

Importantly, the edge devices used in each use case may differ, and in many cases have device-specific characteristics and processing limitations that, in many embodiments of the invention, are considered by and/or incorporated into the models used at those devices. Examples of device-specific characteristics can include device-intrinsic characteristics, for example, available memory, processing speed, image resolution, frame-rate capture and others.

For example, the user interfaces 105 can provide users with analytical feedback based on uploaded datasets 140. Datasets provided by users (referred to as "media datasets" herein) may include, but are not limited to a single image file, multiple image files, a complex image file with multiple images contained therein (e.g., GIF, APNG, WebP, among others), a video file containing one or more frames, multiple video files, audio files, among others. Feedback may include data that characterize datasets before performing further operations on such datasets, such as classifying and balancing image datasets. The feedback may be qualitative in nature (e.g., high quality, low quality, etc.) or quantitative such as one or more quality metrics for the training dataset describing, for example, various photometric properties (brightness, luminance, color spectrum, etc.) and geometric properties (shape, edge definition, etc.) of the image and the potential object(s) of interest in the images.

Datasets containing images may be further analyzed to extract or otherwise generate media properties of the images and other objects contained therein. Media properties may include, but are not limited to, a color index, a brightness index, a contrast index, and other image properties (e.g., temperature, tint, hue, gamma), among others. Datasets containing more than one image, such as complex image files or video file(s), may be analyzed as a batch, identifying, extracting, or otherwise generating media properties for multiple image files or video file(s) of the dataset.

The platform 100 also generates other media properties, such as a complexity index from a media dataset provided by users. A complexity index may be a set of diagnostic data representative of the complexity of a media dataset's images or the one or more frames of a video. The platform may further compare media properties among media datasets provided by users, such as those associated with images, frames of a video file, frames between video files, or between video files themselves. The user interfaces 105 of the platform 100 may also be used to identify or further generate comparisons of media properties or other characteristics of a media dataset or between media datasets. For example, the platform can generate comparisons of the background and foreground of an image dataset, such as that found in individual images or individual frames of a video. Similarly, the platform can also generate a comparison of objects of interest and other objects not of interest as contained within media datasets, such as distinguishing people in an image from background objects. Furthermore, the platform may assign classes to the media datasets for further compared therebetween. Examples of classes may include general categories such as person, human face, car, animal, defect in a manufactured good, or specific classes such as person nearby, person in distance, Adult German Shepherd, Adult Dalmatian, Juvenile Labrador or Crack in material, Contaminated material, or Chip on material.

In other embodiments, the platform 100 can generate a quantitative image salience metric for images in the image dataset, which may comprise a single number or matrix of numbers or other measures assigned at the region or pixel level, which can be used to predict the difficulty or ease with which a computational process can distinguish among objects of interest and/or between objects of interest and background in the image. Based on the image salience metric, a minimum number of images can be determined that are necessary to train a model to achieve a specified accuracy. The process can be augmented with human readable criteria such as brightness, contrast, distance from the camera, etc. to provide further image collection recommendations to further enhance and improve the training dataset. For example, the platform may identify that the training data contains a set of dark/distant images and dark/near images, but adding more bright/distant images will result in a markedly improved training data set. Likewise, if the training data contains high quality images with stark contrast values, adding additional images to the training data may not be necessary or may only marginally increase the accuracy of the model.

According to some embodiments, user interface 105 can provide recommendations to users based on the feedback associated with their media datasets 140. In some examples, recommendations may be provided alongside the feedback or otherwise included therein. Recommendations as provided by the platform may include, but are not limited to suggestions of additional data for users to collect and include in the media dataset, as well as suggested augmentations to one or more media datasets for applying improvements thereto.

According to some embodiments, the analytics performed by the platform 100 may be implemented by machine learning mechanisms or artificial neural networks ("ANNs"). In order to implement such analytics, the platform may further include a criteria gathering system to provide users with access to artificial intelligent tools and capabilities using a front-end user interface. For example, one or more user interfaces may be provided to collect key analytics criteria from users regarding requirements or other preferences by which the platform may use to analyze users' media datasets. For example, users may identify analytics criteria, including, but not limited to, speed and latency requirements as required by a user's implementation, hardware and network requirements as required by a user's implementation, the size of an object to be identified in the media dataset, reaction time tolerances as required by a user's implementation, tolerances for the false positives as identified by the platform, tolerances of false negatives as identified by the platform, precision requirements of predictions made by the platform, among others. In some instances, the criteria gathering system may also facilitate the filtering of large datasets down to datasets that meet certain image criteria or size limitations.

According to some embodiments, the platform identifies the key analytics criteria best adapted for a user's implementation using intelligent systems (e.g., machine learning mechanisms, artificial neural networks, and the like) of the platform. Some embodiments of the criteria gathering system of the platform use dual (or multiple) ANNs to provide users with access to the best artificial intelligent tools and capabilities for their associated use case. In other words, a first neural network may receive media datasets as provided by users and determine the best analytics criteria to be used by a second neural network to perform particular analytics on the same or other media datasets as provided by users. For example, a user may upload video clips of sample use cases to the first neural network. The user may identify a common use case or object, whether selected from a list or identified in a custom manner by the user, to be used for the video clip analysis. Based on the user's selection, the first neural network analyzes the video clips provided by the user to determine the necessary analytics criteria for a second neural network to further properly analyze the uploaded video clips. For example, a first ANN may be used to identify a region of interest in an image that is likely to contain a person in an image having a plurality of other objects, while the second ANN may be used to process the region of interest to perform facial recognition on the image of the person. In some cases, the analytics criteria may be automatically extracted from the video clip, and may include a reaction time, a specific definition of an accuracy metric and a quantitative value of the metric. The first neural network may determine the necessary "reaction time" of the second neural network, the size of the object to be identified by the second neural network, or even determine the ideal number of frames of video that the second neural network can use at runtime to correctly determine a "reaction".

According to some embodiments, the platform may further include intelligence operating tools to facilitate users' implementation of intelligent systems (e.g., machine learning mechanisms, artificial neural networks, and the like) and maintenance thereof. For example, the platform may provide to users integrated compilations of software applications or software development kits (SDKs) for users' particular target hardware. SDK compilations may contain unique licenses (e.g., tokens) embedded therein or associated therewith, however, other licensing models may be used. The software (e.g., SDKs, other software applications, etc.) facilitate the monitoring of statistical information about and/or the performance of the hardware executing the software, as well as the software and communication among the various platform components. The software may further provide comparisons of statistical information about the field of view against statistical information about the training data.

In some examples, the platform provides recommendations to users regarding training data and configuration of intelligent systems using data acquired by the software distributed across the users' hardware. The platform may also provide media datasets as collected by the users' hardware at runtime comprising superimposed predictions therein. In doing so, the platform may further provide a user interface for the users to mark predictions provided in the runtime data as correct, incorrect, or, in some cases, scaled along a gradation of correctness (e.g., a numerical value, a probability, a qualitative tag, etc. that represents the likelihood the prediction is correct) in order to facilitate a semi-supervised learning environment. Upon receiving indications that predictions are correct, the platform may add the associated runtime data to a supplemental training dataset. Adding runtime data with correct or corrected predictions to the supplemental training dataset facilitates a continuous training of a semi-supervised machine learning procedure that updates ANN models (or other artificial intelligent models) for use by users' intelligent systems. Once updated, the ANN models may be deployed to the users' hardware to distribute enhancements to the users' intelligent systems.

The AI/ML training system accesses the user's datasets as provided by the user according to the configurations and parameters of the analytics criteria to generate a subsample of training data. For example, the configurations and parameters as provided by the analytics criteria may include requests to limit training data to datasets with faces that are close to the camera and excluding distant faces. According to some embodiments, generating training data can be extended or further specified based on the type of device that collects the media dataset. Device type data can be implemented using adaptive radiation as described below.

Once the appropriate training data has been collected, the AI/ML training system generates a new ANN model and trains it according to the analytics criteria. The AI/ML training system of the platform may store trained ANN models and other models in a data store for retrieval when requested. Storing trained models may further include storing associated training metadata and associated analytics criteria (e.g., configurations and parameters), both of which may be included as use case data. According to some embodiments, use case data may be indicative of how a particular model may be used and/or what the objective of such a model may be. For example, a model may be used to implement selective attention on media datasets or even used to extract areas therein.

According to some embodiments, the AI/ML training system searches the data store for trained models with meta-architectures capable of best implementing or otherwise handling the data indicated by use case data. Accordingly, the data store may be searched or otherwise filtered based on use case data (e.g., analytics criteria, training metadata) of the stored models. According to some embodiments, similar use case data across multiple models may be indicative of a meta-architecture of the models stored therein.

For example, the AI/ML training system may search its associated data store for ANN models trained to detect objects of interest of a particular size. Therefore, the models identified by this search may be defined as a particular meta-architecture representative of an architecture capable of identifying objects of interest at a particular size. Similarly, the AI/ML training system may search its associated data store for ANN models trained to analyze the relative complexity of the foreground and background of media datasets received as input. Therefore, the models identified by this search may be defined as a particular meta-architecture representative of an architecture capable of analyzing the relative complexity of a media dataset's foreground and backgrounds.

According to some embodiments, meta-architectures may be further identified or otherwise organized in the data store as custom meta-architectures. Custom meta-architectures may be identified by use cases for the underlying models, such as models used for selective attention or models used for object detection. According to some embodiments, ANNs themselves, as well as other trained search models, may be used to perform searches of or otherwise extract results from the data store associated with the AI/ML, training system. Accordingly, one or more search ANNs may be used to identify a meta-architecture candidate containing models (or otherwise the models themselves) similar to that of a use case identified by a user. For example, a user may provide a search ANN analytics criteria or other data indicative of a model for determining the complexity of media datasets and, as a result, the search ANN return a meta-architecture (or otherwise the models therein) indicative of such a use case.

According to some embodiments, search ANNs used for meta-architecture search may be similarly trained according to the other ANNs provided by the platform. Search ANNs may further be trained according to unique loss functions. For example, search ANNs may be trained using a selective attention metric, among other techniques. Furthermore, search ANNs may be optimized according to various characteristics necessitated by a particular search, such as a particular search order, prioritization, density, and depth of search space, among others. Similarly, search ANNs may be optimized according to Bayesian Optimization strategies, Gaussian processes, or otherwise using statistical weightings to determine correlation of analytics criteria (e.g., training cycle parameters) to data associated with training data and/or use case data.

The AI/ML training system may use an ANN for finding the optimum error threshold for a particular model and use case according to analytics criteria as provided by a user, among other data. For example, a model with a use case for finding clusters of pixels (or region of interest, or "ROI") that represent an object of interest based on a three-dimensional map of inputs (e.g., x location, y location, and probability that an object of interest exists at that location) may be given a particular error threshold. Accordingly, an ANN may determine a higher error threshold for a model with a similar use case with an additional level of complexity, such as another input dimension (e.g., x location, y location, probability that an object of interest exists at that location, and a time index of a particular frame). Certain approaches for identifying regions of interest and objects within those regions are described in U.S. patent application Ser. No. 16/953,585, the entire disclosure of which is incorporated herein by reference.

In certain embodiments of the present invention, a ground truth polygon mask (or "ground truth label") may be used to define an ROI within an image. In convention techniques, a binary determination is made based on pixel values, such that pixels inside the polygon are deemed to be part of the object, whereas pixels outside the polygon are deemed to be "not the object." In certain embodiments of the invention, a "pixel salience value" can be assigned as the z value for each x-y pixel location within the ground truth polygon representing the likelihood that the pixel is part of the object in question, and a salience surface map can be generated of the ROI. In some cases, pixels or groups of pixels that meet a certain likelihood threshold can be inferred to be part of the object.

In some cases, instead of (or in addition to) independently calculating or assigning a salience value to each pixel, a curve shape can be applied to the salience surface map based, for example, on an expected object in the ROI, such as a head shape where a person's face is expected. The curve shape associated with a "head" (e.g., a hat) can be used to make an inference as to whether the object is a head. In some instances, each pixel is assigned an initial value based on a predefined distribution for the object in question and a difference value may be calculated. For example, facial recognition may be best predicted with a "hybrid Gaussian" curve, where an initial step up in salience occurs at the edge of the ROI, and the values across the ROI follow a Gaussian gradient shape such that pixels nearer the center of the ROI have a higher salience value than those along the edges. In some cases, different curve shapes may be used to infer the presence of different objects of interest in the ROI. For example, for smaller, continuous objects such as a street sign, a Poisson distribution may be used to assign salience values to the pixels, whereas a different distribution may be used for larger objects where the edge boundaries are critical, such as a car or other vehicle. The "fit" between a particular shape (or a series of shapes) and the object of interest can then be used to further train the object ANN models for subsequent object detection.

These gradient values can be applied to various images and, based on the degree of fit and accuracy, used as input into the training step to further refine each model for specific objects use cases, devices, or combinations thereof.

According to some embodiments, once a model is identified by the AI/ML training system, it may be further trained or otherwise optimized using, for example, transfer learning (e.g., adaptive radiation) as described below.

According to some embodiments, the AI/ML training system may further determine a model cooperation structure to facilitate intelligent distribution of data across the remote hardware of a customer environment and, in some cases, using and merging two or more models. For example, a model used for selective attention may be structured or otherwise organized to forward a feature map to a second model such as an object detection model rather than operating on the image data it initially received. This deployment option may be useful in instances where, for example, the initial selective attention model and the second, object detection model are combined into a single wrapper function and deployed to an endpoint device provided via control flow software. In such examples, a "switched pipeline" implementation may be used where the two (or in some cases more than two) models can be executed against the same input data either in parallel, or in sequence as directed by a user or a preconfigured switch. As such, devices that, due to processor and/or power constraints can only support execution of single model can perform two different inferences (e.g., finding an area of interest within an image, then an object within the area of interest) using two distinct but "merged" ANN models.

The model cooperation structure as determined by the AI/ML training system may be stored or otherwise indicated by a data store associated with the business logic component of the platform.

According to some embodiments, the platform may construct SDKs and other software from a single ANN model as provided by the AI/ML training system. Accordingly, the compiler as implemented by the platform can compile models for multiple different hardware architecture targets for execution on the specific hardware located in the customer environment. In conventional implementations ANN models are trained using hardware-agnostic parameters. While this approach simplifies the training and deployment, accuracy and performance suffers. In doing so, when the models are compiled, subtle changes to the processing can be introduced, which may result in sub-optimal processing on certain hardware devices. To address this problem, in some embodiments of the invention, the training processes are executed on the processor(s) (or emulators) that are specific to the edge device hardware (e.g., a particular model of camera). Analyzing the results of the training step occurring on particular hardware allows the model to be trained for that particular device, resulting in a hardware-specific variant of the model, optimized for the processor(s) used in that device. In some cases, a "library" of emulators is provided to process the training data and model for each specific device.

According to some embodiments, SDKs and other software is distributed using a unique DRM system. In one example, the unique DRM system provides a heartbeat-like system wherein data may be transmitted to a central licensing authorization server based on a predetermined time period. Data transmitted during each beat of the heartbeat-like system may include, but not limited to, data and metadata of the media dataset and the image itself, such as indications of the scene, location (e.g., GPS coordinates), detection event data such as width, height and timeindex, speed of inference, frequency of SDK use and other data associated therewith. The predetermined time period may be unique to each user environment or each device. In some examples, a risk engine may be incorporated into the unique DRM system in order to determine if a license associated with a customer environment utilize a longer predetermined time period or a shorter predetermined time period. The risk engine may also determine if a license should be denied based on one or more license restrictions, usage limits, time periods, etc. Furthermore, data received from devices or other endpoints that are considered suspicious or otherwise suspect to the DRM system may be elevated to user's attention.

According to some embodiments, the unique DRM system may further track how software and other data is used by hardware of a customer environment. For example, the DRM system may track the use of particular models, detections associated with each model, use case detections, among other data. Accordingly, the DRM system can determine a price for a user based on software and data usage tracked on each device or hardware of the user environment.

According to some embodiments, data provided in the heartbeat-like system may be used to identify devices that are malfunctioning or devices which have been tampered or obstructed through a heuristic or risk-engine type system.

The platform further provides a visual intelligence SDK with various artificial intelligent (AI) detection mechanisms. According to some embodiments, visual intelligence SDK may include features such as inference, image processing, unique DRM, quality control sampling, and over-the-air updates, among others. Visual intelligence SDK may implement a dynamic post processing analytics engine to detect a consensus across one or more sequential images from one or more devices across the user environment.

Similarly, consensus detection of the visual intelligence SDK may be similarly implemented across one or more user environments in order to detect consensuses across one or more user environments. In such cases, the process increases number of frames being classified and voting strategies across multiple frames of images so that the inconsistency can be mitigated and hence improving the model's accuracy prior to edge deployment. More specifically, a user can specify a temporal window of frames (e.g., 10 frames) from a video file to make multiple inferences on some or all frames within that window. A comparison is performed measuring the difference between an image known to include the object in questions (e.g., a particular person's face) and the image in each frame. If a certain percentage (e.g., 50%, which may be user defined) of frame embeddings are below designated distance threshold (again, which may also be user defined), then the object is considered to be the same as the object captured from the multiple-frames.

The visual intelligence SDK may also implement privacy features as provided by privacy ANNs or other artificial intelligent models of the platform. For example, a model trained for selective attention may be implemented to filter out sensitive information (e.g., faces, PPI, nudity, or other sensitive data) for use in quality assurance (QA) sampling by the platform. Similarly, a model trained for selective attention may be distributed edge devices or other hardware in the user environment to filter out sensitive information before further analysis or transmission to other devices. Models may accomplish such privacy filtering by encrypting, redacting, obfuscating or compressing the field of view of a media dataset or otherwise removing sensitive data using a cropping feature. Models may also extract particular areas (e.g., objects of interest) from a media dataset (removing the rest of the dataset) for privacy purposes. For example, after identifying an object of interest in a media dataset, one or more models may extract only the object of interest, removing the rest of the environment in the field of view to maintain the privacy of others in the rest of the environment. Accordingly, the smaller images extracted by the models may further include data annotations therein to identify the placement of the extracted images in the original field of view and facilitate construction of the original media dataset with unimportant data removed.

In some embodiments privacy filtering may encrypt the field of view or portions of the field of view using techniques that require multiple-factors for decryption. In some embodiments one such factor is a unique token that changes according to a time series. In such embodiments, media images or video could be decrypted only by using user authorization factors in conjunction with the specific token corresponding to a time period on a specific device or group of devices. In some embodiments, the decryption token is stored digitally such that retrieval of the token is recorded in e.g. for purposes of audit or governance.

Unique Data Structure (for Transmission of Video Data with Variable Resolutions)

Figure 2:
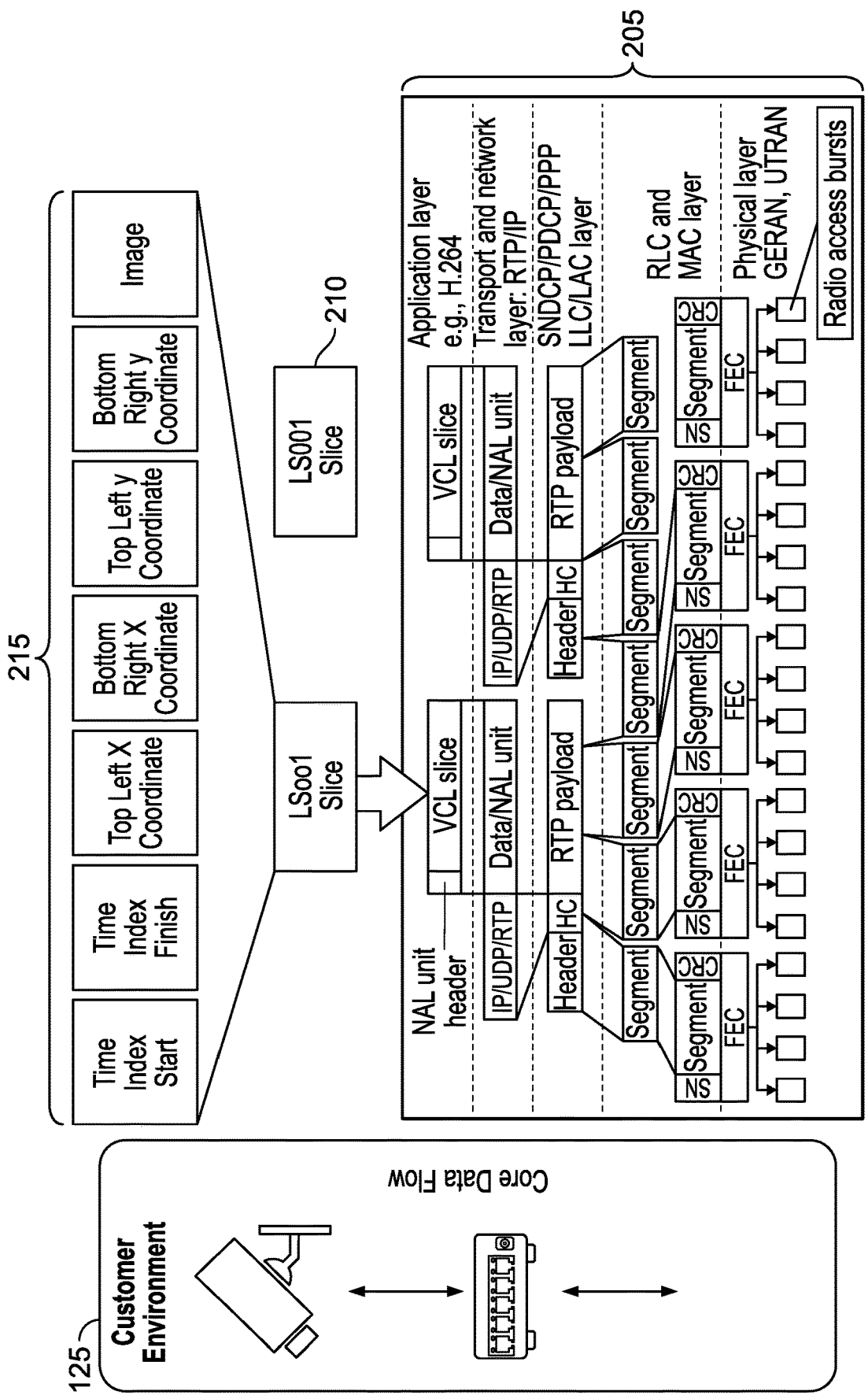
FIG. 2 illustrates an exemplary data architecture in accordance with various embodiments of the invention.

Similar to the privacy features implemented by the visual intelligence SDK detailed above, the visual intelligence SDK (or other software provided by the platform) may also extract particular areas (e.g., objects of interest) from a media dataset (removing the rest of the dataset) for generating a media dataset of smaller images for reducing the file size of transmission. Accordingly, the smaller images extracted by the models may further include data annotations therein to identify the placement of the extracted images in the original field of view and facilitate construction of the original media dataset with uninteresting data removed. By removing uninteresting data from the media dataset before transmission, the smaller media dataset may be transmitted over a network at a significantly reduced file size. Referring to FIG. 2, a data file architecture representing video data using the H.264 protocol (205) includes a significant amount of data that is not needed for image detection and extraction according to the techniques described herein. Instead, a slice (or slices) (210) of the data is selected that include contents that encapsulate one or more regions of interest from the video segment. The contents of the "slice" 210 may include various parameters 215 related to a region of interest in the image. The parameters may include, for example, a time index start and finish, top, bottom, right and left coordinates, and the extracted image itself, or, in some cases, a downsampled version of the image.

Reduced file sizes may be further accomplished at the edge devices of a user environment by transmitting at high resolution the areas of the media dataset that contain objects of interest while transmitting the remainder of the field of view in low resolution. The high resolution and low resolution areas of the digital media dataset may be transmitted as a reduced media dataset with a file size significantly smaller than the original media dataset. Similarly to the reconstruction described above, the reduced media dataset may further include data annotations therein to identify the placement of the high-resolution images and low-resolution images in the original field of view to facilitate construction of the original media dataset with only areas containing objects of interest in high-resolution. Video files may repeat the file reduction and construction processes for each frame of the video file.

The AI/ML training system of the platform as described herein may further provide the ability for a pre-trained model to be further trained using data associated with real-time data collected by the edge devices and other hardware of the user's environment. As described above, once a model is identified by the AI/ML training system, it may be further trained or otherwise optimized using a training method called adaptive radiation (e.g., continuous transfer learning method). Alternatively, adaptive radiation may be performed on ANN models that are already distributed to the hardware of a user's environment, e.g. by federated learning techniques.

Figure 3:
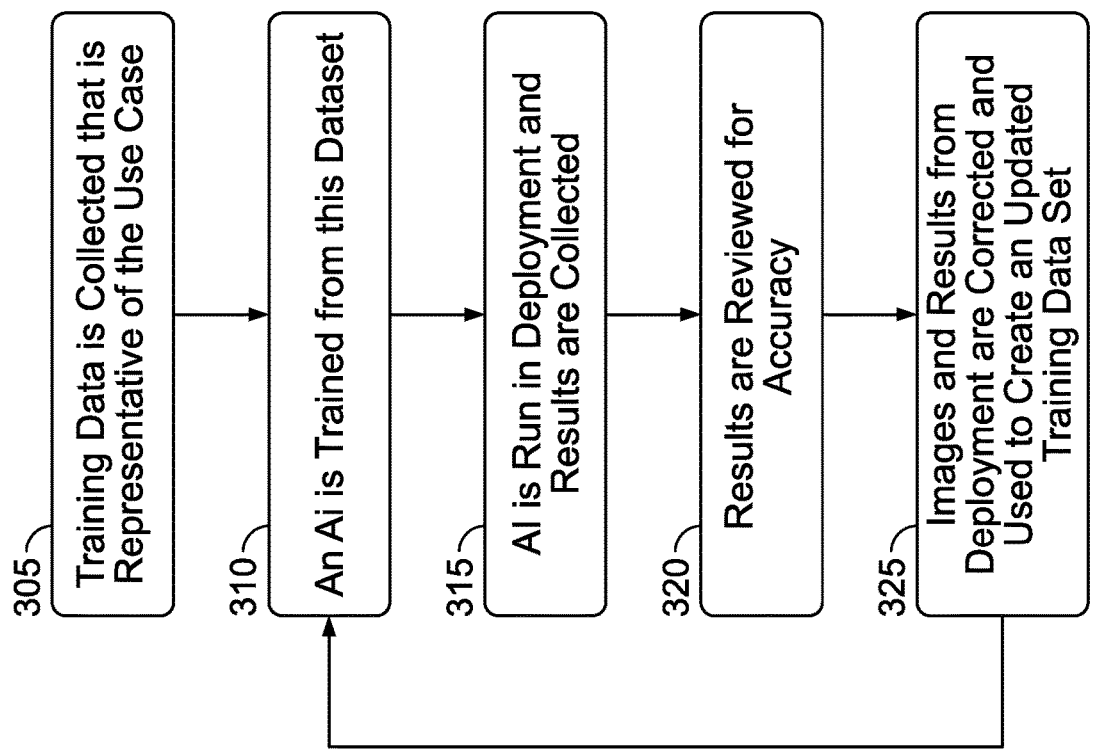
FIG. 3 is a flowchart that illustrates a model training process that may be implemented and executed in accordance with various embodiments of the invention.

According to some embodiments and referring to FIG. 3, the user's environment may contain an ANN model based on or otherwise supplied from the datastore store of the AI/ML training system 120 of the platform 100. Quality assurance (QA) sampling data ("training data") may be collected from the model and transmitted to a review module (STEP 305) and used as an initial training set for an initial ANN/AI model (STEP 310). The model can then be deployed and results collected from its use in the field (STEP 315). The QA sampling data may be reviewed using an automated review process and/or a human review (e.g., reviewed by the user) (STEP 320). The automated review process may be executed by an ANN model to identify relevant (e.g., correct) data from the QA sampling data. Alternatively, a human (e.g., the user) may review the QA sampling data for accuracy, manually marking results as either correct or incorrect. Similarly, a human may review the QA data in conjunction with the ANN model to expedite the human review of QA sampling data. The reviewed QA sampling data (e.g., data marked as correct) may be stored as training data or otherwise incorporated into training data stored in a data store in order to apply updates to the ANN model during retraining. Once the training data has been updated, an updated ANN model may be generated or otherwise trained therefrom (STEP 325). The platform may distribute the updated ANN model to the hardware of a user's environment to provide a model better trained for user's particular use case.

Figure 4:
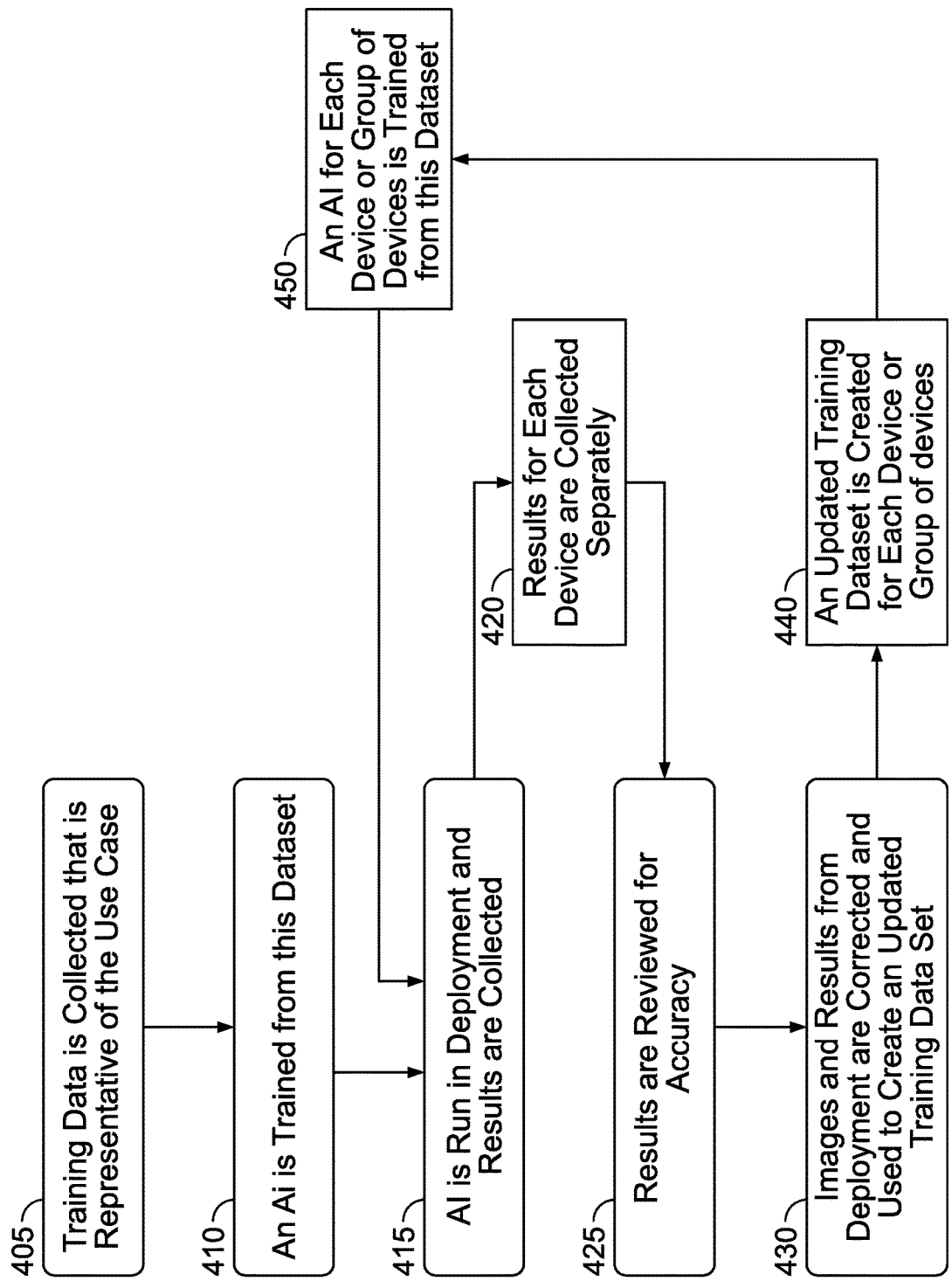
FIG. 4 is a flowchart that illustrates an exemplary method for developing training datasets in accordance with various embodiments of the invention.

According to some embodiments, and in reference to FIG. 4, the adaptive radiation procedure as described above may be provided or otherwise implemented differently for different devices of the user environment's hardware. For example, QA sample data may be reviewed by an ANN model and, after review, provided to a data store associated with a particular device's individual training data. Similar to the training described above, the updated training data may be reviewed by an ANN model, a human, or a combination thereof. Reviewed QA sample data stored in a data store may be correlated to feedback data or other media information associated with the media dataset, such as brightness, background complexity, size or geometry of objects of interest, and data associated with the device(s) (e.g., statistical device information), among others. An ANN model may select the reviewed QA sample data to retrain or further update ANN models for one or more target devices. Accordingly, each particular device may receive an updated model trained or further updated using only reviewed QA sample data received from that particular device. Alternatively, the QA sample data may be provided to a data store associated with the training data for a particular group of devices, allowing groups of devices to receive updated models trained or further updated using only reviewed QA sample data received from that particular group of devices.

More specifically, QA sample data is collected and/or received from various sources that represent a specific use case (STEP 405), and an initial AI model is trained using the collected data (STEP 410). Like the prior use case, the AI model is deployed into the field corresponding to the use case, and results are collected (STEP 415). In this embodiment, the results can be collected and stored separately or otherwise identified as being sourced from a different device or deployment (STEP 420), whereas in other instances the data can be consolidated into a single dataset. The results are then reviewed for accuracy, either using automated processes, human review, or a combination of both (STEP 425). Once deemed accurate and sufficient, the images and the associated results are corrected and used to create an updated training dataset (STEP 430), and, in certain instances, the dataset can be segregated such that specific datasets are assigned to specific devices or groupings of devices (STEP 440). The groupings can be based on a number of commonalities such as a manufacturer, make and/or model of a camera, the environment in which the devices are used (e.g., training sets for images placed outdoors versus indoors, night images versus daylight images, etc.), and/or functional use case commonalities, such as facial recognition versus character recognition, etc. Once the updated training datasets are created for the specific device(s), they are then used to train updated AI models for the specific device (STEP 450). The process then iterates over time as the new AI model is deployed and used in the field, new data is collected, and the process repeats, resulting in continuously improved AI models that are specific to a particular device and/or use case.

Further to the training described above, the platform may further provide a retraining maintenance module that monitors the models for all devices of the user's environment and retrains each automatically. The retraining maintenance module may incorporate an ANN or other model to determine monitoring criteria associated thereto. For example, the retraining maintenance module may use Bayesian Optimization to determine the frequency at which the retraining maintenance module retrieves QA sample data for quality assurance and quality control purposes. Furthermore, the retraining maintenance module may further determine, by way of an ANN model or other model, how devices of the user's environment should be grouped or otherwise organized for training. For example, the retraining maintenance module may optimize the size of each device group based on their use case or other data related to the devices. The devices for each device group may share reviewed QA sample data (e.g., supplemental training data) in order to most effectively train each ANN model therein.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The phraseology and terminology used herein is for the purpose of description and should not be regarded as limiting. The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

The invention claimed is:

1. A method for generating device-specific artificial neural network (ANN) models for distribution across user devices, the method comprising:
   receiving, by a processor, sample datasets from the user devices of a user environment, wherein the sample datasets comprise media data and predictions by device-specific ANN models executing on the user devices, each of the device-specific ANN models developed specifically for a corresponding user device of the user devices;
   writing, by the processer, the sample datasets to a training data store;
   identifying, by the processor and in a data store, a use case dataset, the use case dataset comprising at least training data parameters;
   identifying, by the processor and in the training data store, training data from the sample datasets that meet the training data parameters provided in the use case dataset;
   identifying, by the processor and in the data store, stored instances of the device-specific ANN models; and
   generating, by the processor, updated device-specific ANN models from each of the stored instances of the device-specific ANN models based on the training data.

2. The method of claim 1 wherein the user devices comprise a plurality of image capture devices.

3. The method of claim 1 wherein the media data comprises image data and application of the ANN models to the image data facilitates the identification of objects of interest within the image data.

4. The method of claim 1 wherein the training data parameters include media data parameters and device parameters.

5. The method of claim 4 wherein the media data parameters include one or more of a color index, a brightness index, a contrast index, an image temperature, a tint, one or more hue values, and a gamma value.

6. The method of claim 4 wherein the device parameters include one or more of available memory, processing speed, image resolution, and frame-rate capture.

7. The method of claim 1 wherein the use case dataset is specific to a particular use case.

8. The method of claim 7 wherein a use case comprises an environmental aspect and a functional aspect.

9. The method of claim 8 wherein the functional aspect of the use case comprises facial recognition.

10. The method of claim 8 wherein the environmental aspect of the use case comprises one of placement of the device in an outdoor environment, placement of the device in an indoor environment, placement of the device in a well-lit environment, or placement of the device in a poorly-lit environment.

11. The method of claim 1 wherein the predictions generated by the device-specific ANN models comprise a quantitative image salience metric for each image that indicates the likelihood that the media file contains an object of interest.

12. The method of claim 11 further comprising determining, based at least in part on the quantitative image salience metrics for each image, a minimum number of images necessary to achieve a threshold model accuracy.

13. The method of claim 1 further comprising maintaining a library of device-specific parameters and training data, and wherein generating the updated device-specific ANN models is further based on the device-specific parameters and training data.

14. The method of claim 1 further comprising distributing, by the processor, the device-specific updated ANN models to at least a subset of the user devices associated therewith.

15. A system for generating device-specific artificial neural network (ANN) models for distribution across user devices, the system comprising:
   one or more processors; and
   a memory coupled with the one or more processors wherein the one or more processors executes a plurality of modules stored in the memory and wherein the plurality of modules comprises:
      a user interface that receives instructions from a user, the instructions identifying one or more sample datasets from the user devices of a user environment, wherein the sample datasets comprise media data and predictions by device-specific ANN models executing on the user devices, each of the device-specific ANN models developed specifically for a corresponding user device of the user devices;
      a data store comprising the sample datasets;
      a business logic module that, when executed, (i) identifies a use case dataset stored in the data store, the use case dataset comprising at least training data parameters (ii) identifies training data from the sample datasets that meet the training data parameters provided in the use case dataset and (iii) identifies device-specific ANN models stored in the data store; and
      an artificial intelligence machine learning module that when executed generates updated device-specific ANN models from each of the stored instances of the device-specific ANN models based on the training data.

16. The system of claim 15 wherein the user devices comprise a plurality of image capture devices.

17. The system of claim 16 wherein the media data comprises image data and application of the ANN models to the image data facilitates the identification of objects of interest within the image data.

18. The system of claim 15 wherein the training data parameters include media data parameters and device parameters.

19. The system of claim 18 wherein the media data parameters include one or more of a color index, a brightness index, a contrast index, an image temperature, a tint, one or more hue values, and a gamma value.

20. The system of claim 18 wherein the device parameters include one or more of available memory, processing speed, image resolution, and frame-rate capture.

21. The system of claim 15 wherein the use case dataset is specific to a particular use case.

22. The system of claim 21 wherein a use case comprises an environmental aspect and a functional aspect.

23. The system of claim 22 wherein the functional aspect of the use case comprises facial recognition.

24. The system of claim 22 wherein the environmental aspect of the use case comprises one of placement of the device in an outdoor environment, placement of the device in an indoor environment, placement of the device in a well-lit environment, or placement of the device in a poorly-lit environment.

25. The system of claim 15 wherein the predictions generated by the device-specific ANN models comprise a quantitative image salience metric for each image that indicates the likelihood that the media file contains an object of interest.

26. The system of claim 25 wherein the artificial intelligence machine learning module further determines, based at least in part on the quantitative image salience metrics for each image, a minimum number of images necessary to achieve a threshold model accuracy.

27. The system of claim 15 further comprising a library of device-specific parameters and training data, and wherein the artificial intelligence machine learning module generates the updated device-specific ANN models based on the device-specific parameters and training data.

28. The system of claim 15 further comprising a deployment module for distributing the device-specific updated ANN models to at least a subset of the user devices associated therewith.

29. The system of claim 1 further comprising receiving, by the processer, additional datasets from the user devices, the additional datasets being collected by the user devices based on one or more feedbacks associated with the sample datasets.

* * * * *